United States Patent [19]

Kanai et al.

[11] 3,952,608
[45] Apr. 27, 1976

[54] COLLAPSIBLE SPACER IN FINAL DRIVE UNIT OF MOTOR VEHICLE

[75] Inventors: Hukashi Kanai; Yasuo Mori; Kyoichi Toyoda, all of Yokohama, Japan

[73] Assignee: Nissan Motor Company, Limited, Japan

[22] Filed: Nov. 26, 1974

[21] Appl. No.: 527,376

[30] Foreign Application Priority Data
Nov. 27, 1973 Japan.................. 48-136359[U]

[52] U.S. Cl................................. 74/411; 64/30 C
[51] Int. Cl.².................................. F16H 57/00
[58] Field of Search ........... 74/411, 424, 409, 423, 74/410; 64/11, 15 B, 27 B, 30 C; 403/223

[56] References Cited
UNITED STATES PATENTS
3,006,215  10/1961  Musser........................ 74/409 X
3,626,789  12/1971  Winter et al.................. 74/410 X
3,744,274  7/1973  Sekiya et al................... 64/30·C

*Primary Examiner*—Leonard H. Gerin
*Attorney, Agent, or Firm*—Robert E. Burns; Emmanuel J. Lobato; Bruce L. Adams

[57] ABSTRACT

A thin walled metal tubular spacer disposable in use in a compressed state between a pair of spaced pinion shaft bearings in a final drive unit to preload the pinion bearings. The tubular spacer is generally cylindrical and has a circumferential bulged portion to facilitate longitudinal compression of the tubular spacer, and has a cylindrical portion having at least one elongated opening therethrough. The elongated opening is oriented with its major dimension extending in the longitudinal dimension of the tubular spacer and facilitates torsional deformation of the cylindrical portion having at least one elongated opening therethrough.

12 Claims, 3 Drawing Figures

COLLAPSIBLE SPACER IN FINAL DRIVE UNIT OF MOTOR VEHICLE

The present invention relates to a final drive unit in a motor vehicle drive line connecting a propeller or drive shaft with vehicle driving wheels through a differential drive.

The motor vehicle drive line generally has a propeller shaft, a final drive unit and rear axles of the vehicle driving wheels and transmits engine power through a transmission to the driving wheels so as to drive the motor vehicle.

The final drive unit includes, in general, a drive pinion which is in constant mesh with a ring gear of a differential. The pinion shaft of the drive pinion is rotatably mounted in a carrier housing by means of front and rear pinion bearings. Between the inner bearing races of the front and rear pinion bearings, a cylindrical sleeve or collapsible spacer is interposed surrounding the pinion shaft for supplying the two opposite pinion bearings with preload.

The collapsible spacer is made of metal and is constructed with a thin wall because, after installation, it may be distored to some extent by being axially compressed at the both ends thereof which contact with the inner bearing races of the front and rear pinion bearings.

In the aforementioned construction of the spacer, difficulties have been encountered in that contacting surfaces between the both inner bearing races of the front and rear pinion bearings and both ends of the collapsible spacer are relatively small and the pressure applied to the contacting surface is excessively high as the cylindrical wall has to be made thin. Therefore, when the pinion shaft of the drive pinion is subjected to a torsion due to sudden torque variation applied thereto during starting or acceleration of the motor vehicle, unpleasant noises are generated from rubbing of the both ends of the collapsible spacer with the both inner bearing races which are secured to the pinion shaft of the drive pinion.

Accordingly, it is an object of the present invention to provide an improved final drive unit constructed to prevent generating unpleasant noises due to rubbing of the collapsible spacer with the inner bearing races of the pinion bearings.

It is another object of the present invention to provide an improved collapsible spacer in the final drive unit which can be twisted in accordance with torsion of the pinion shaft of the drive pinion for preventing rubbing of the ends of the collapsible spacer with the inner bearing races of the pinion bearings.

Other objects and features of the final drive unit incorporating the improvement according to the present invention will become more apparent from the following description taken in conjunction with the accompanying drawing in which.

Figure 1:
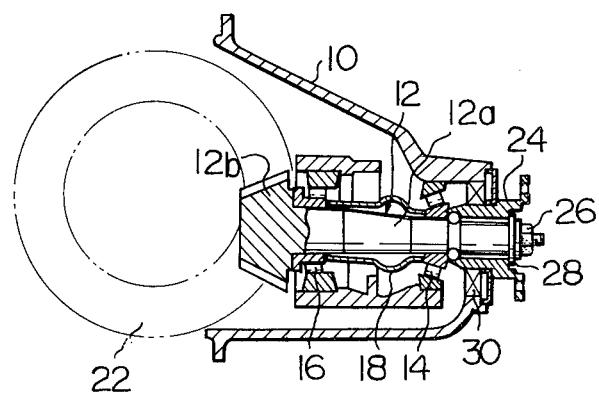
FIG. 1 is a sectional view of essential parts of the final drive unit according to the present invention incorporating a collapsible spacer.

FIG. 1 illustrates a final drive unit in a drive line of a motor vehicle (not shown). The final drive unit includes a carrier housing 10 which is fastened on a vehicle body (not shown). The pinion shaft 12a of a drive pinion 12, extending in a fore-and-aft direction of the vehicle body, is rotatably mounted in this carrier housing 10 through front and rear pinion bearings 14 and 16 which are shown as being tapered roller bearings. Between the front and rear pinion bearings, a metal cylinder or a collapsible spacer 18 with a thin wall is interposed in such a manner that front and rear ends 18a and 18b of the collapsible spacer 18 contact with the inner bearing races of the front and rear pinion bearings, respectively.

The pinion shaft 12a carries at its rear end a driving pinion gear 12b which is in constant mesh with a crown wheel or ring gear 22. At the front end of the pinion shaft 12a is installed a companion flange 24 which is secured around the pinion shaft 12a by means of a companion flange nut 26 through a lockwasher 28. Designated by reference numeral 30 is an annular oil seal which is interposed between the sleeve portion of the companion flange 24 and the carrier housing 10. The companion flange 24 is connected to a propeller shaft through a rear universal joint, neither of which is shown.

With this arrangement, the front pinion bearing 14 will be pushed until the collapsible spacer 18 distorts to some extent for supplying the pinion bearings 14 and 16 with "preload" by tightening the companion flange nut 26. The distorted collapsible spacer 18 keeps the inner bearing races of the pinion bearings 14 and 16 from turning on the pinion shaft 12a.

Figure 2A:
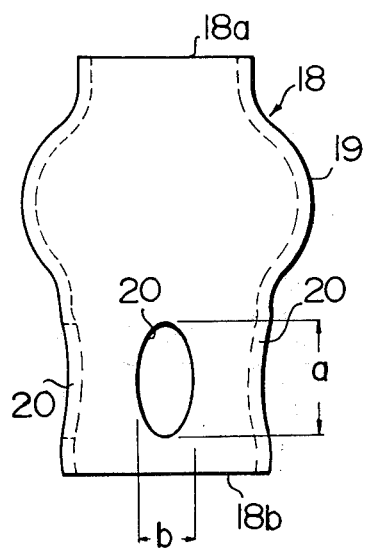
FIG. 2A is an enlarged elevational view of the collapsible spacer shown in FIG. 1.

FIG. 2A illustrates a preferred form of the collapsible spacer of FIG. 1. The collapsible spacer 18 is made of metal with a thin wall and is generally cylindrical. The generally cylindrical spacer 18 is formed with an annular bulged portion 19 along the circumference thereof at a portion adjacent to the front end 18a thereof to allow easier axial plastic deformation. In addition, the spacer 18 has one or more openings 20 along the circumference thereof at its cylindrical portion adjacent to the rear end 18b thereof. Each of the openings 20 is made in the form of an ellipse as shown in FIG. 2A such that the maximum size $a$ in the longitudinal direction of the spacer 18 is larger than the size $b$ in the circumferential direction of the same.

This construction having openings 20 has been derived from experiments which demonstrated that torsion applied longitudinally to the collapsible spacer 18 is absorbed by the relatively wide cylindrical portion which width corresponds to the longitudinal maximum size $a$ of the opening 20 as compared with the contrary case in which the longitudinal size $a$ is less than the circumferential size $b$. This prevents damage to the cylindrical portion of the spacer 18 where the torsion applied is absorbed. By this construction, when the torsion is applied to the longitudinal axis of the collapsible spacer 18, it is mainly twisted at its circumferential portion including the opening portions of the circumferential size $b$.

Figure 2B:
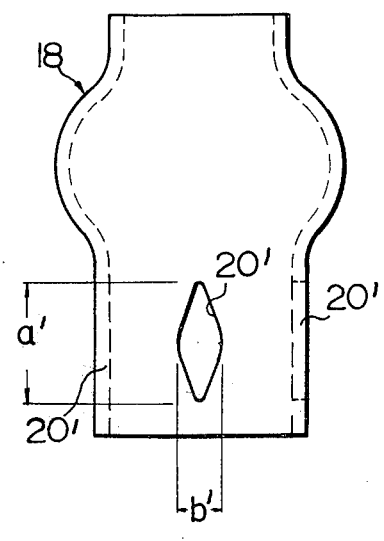
FIG. 2B is another enlarged elevational view similar to FIG. 2A.

FIG. 2B illustrates another preferred form of the collapsible spacer 18 similar to that of FIG. 2A with the exception that the collapsible spacer 18 has one or more openings 22' in the form of a rhombus instead of elliptical openings 20 of FIG. 2A. Also in this instance, each of the openings 20' is dimensioned in a manner similar to that shown in FIG. 2B so that the maximum size $a'$ in the longitudinal direction of the collapsible spacer 18 is larger than size $b'$ in the circumferential direction of the same.

It will be understood that the inner four corners of the opening 20' are rounded to prevent that spacer 18 from cracking which generally results from sharpened inner corners during twisting.

Experiments reveal that it is preferable that 3 to 5 of openings 20 and 20' in FIGS. 2A and 2B are arranged at regular intervals along the circumference of the cylindrical spacer 18.

It should be understood that when the pinion shaft 12a of the drive pinion 12 is twisted around the longitudinal axis thereof by sudden torque variation applied thereto, the collapsible spacer 18 interposed between the front and rear pinion bearings 14 and 16 can be easily twisted in accordance with the torsion of the pinion shaft 12a of the drive pinion 12 because of the weakened portion of the collapsible spacer 18 which includes the opening 20 or 20' according to the present invention. Therefore, unpleasant noises due to rubbing of the front and rear ends 18a and 18b of the spacer 18 with the corresponding inner bearing races of the pinion bearings 14 and 16 can be eliminated.

What I claim is:

1. A final drive unit of a motor vehicle comprising: a carrier housing; a drive pinion having a shaft and disposed within said carrier housing; front and rear pinion bearings disposed around the pinion shaft of said drive pinion and being separated from each other, said pinion bearings rotatably supporting said pinion shaft within said carrier housing; and a collapsible tubular spacer made of a metal cylinder with a shaped thin wall, disposed around said pinion shaft and interposed in a compressed state between the inner bearing races of said front and rear pinion bearings for supplying a preload to said pinion bearings, said collapsible spacer including a cylindrical portion having at least one lateral opening therethrough so as to be able to be twisted by torsion applied on the pinion shaft, said at least one opening being larger in the longitudinal direction of the collapsible spacer than in the circumferential direction of the same.

2. A final drive unit as claimed in claim 1, in which said opening is in the form of one selected from a group consisting of an ellipse and a rhombus.

3. A final drive unit as claimed in claim 2, in which the corners of said rhombus are rounded.

4. A final drive unit as claimed in claim 1, in which at least three of said openings are arranged at regular intervals along the circumference of said collapsible spacer.

5. A collapsible spacer which is made of a shaped tubular metal cylinder with a thin wall, disposed in use around the pinion shaft of a drive pinion and interposed between the inner bearing races of front and rear pinion bearings of a final drive unit for supplying preload to the pinion bearings, said collapsible spacer comprising: a shaped metal cylinder with a portion having at least one lateral opening therethrough so as to be able to be twisted in accordance with torsion of the pinion shaft, said opening being larger in the longitudinal direction of the collapsible spacer than in the circumferential direction of the same, said collapsible spacer being axially plastically deformed by being compressed with the pinion bearings after installation.

6. A collapsible spacer as claimed in claim 5, in which said opening is in the form of one selected from a group consisting of an ellipse and a rhombus.

7. A collapsible spacer as claimed in claim 6, in which the corners of said rhombus are rounded.

8. A collapsible spacer as claimed in claim 5, in which at least three of said openings are arranged at regular intervals along the circumference of said collapsible spacer.

9. A pinion shaft bearing spacer comprising; a metal tube having a circumferentially bulged portion to facilitate longitudinal compression thereof and a generally cylindrical portion, said generally cylindrical portion having therethrough at least one elongated lateral opening oriented with its major dimension generally parallel to the longitudinal dimension of said generally cylindrical portion to facilitate torsional deformation thereof.

10. A pinion shaft bearing spacer according to claim 9, wherein the elongated opening is oval shaped.

11. A pinion shaft bearing spacer according to claim 9, wherein the elongated opening is rhomboid shaped with rounded corners.

12. A pinion shaft bearing spacer according to claim 9, wherein said generally cylindrical portion has at least three elongated openings therethrough equally circumferentially spaced of said generally cylindrical portion.

* * * * *